No. 633,310. Patented Sept. 19, 1899.
H. R. GAYLORD.
FREEZING DEVICE FOR MICROTOMES.
(Application filed Dec. 30, 1898.)
(No Model.)

Witnesses:
Chas. F. Burkhart.
Henry L. Deck.

H. R. Gaylord, Inventor.
By Wilhelm Bonner
Attorneys.

THE NORRIS PETERS CO., PHOTO-LITHO., WASHINGTON, D.C.

United States Patent Office.

HARVEY R. GAYLORD, OF BUFFALO, NEW YORK, ASSIGNOR TO THE SPENCER LENS COMPANY, OF SAME PLACE.

FREEZING DEVICE FOR MICROTOMES.

SPECIFICATION forming part of Letters Patent No. 633,310, dated September 19, 1899.

Application filed December 30, 1898. Serial No. 700,693. (No model.)

*To all whom it may concern:*

Be it known that I, HARVEY R. GAYLORD, a citizen of the United States, residing at Buffalo, in the county of Erie and State of New York, have invented a new and useful Improvement in Freezing Devices for Microtomes, of which the following is a specification.

This invention relates to a freezing device for microtomes whereby the object is frozen hard, so as to permit the blade to cut fine slices from the object.

The purpose of this invention is to produce a freezing device of this character which permits of freezing the object readily and conveniently and of holding it firmly in place and to provide means whereby any liquid which may run over the edge of the object-support is collected and prevented from freezing on the under side of said support, and thereby impair the freezing of the object.

Figure 1:
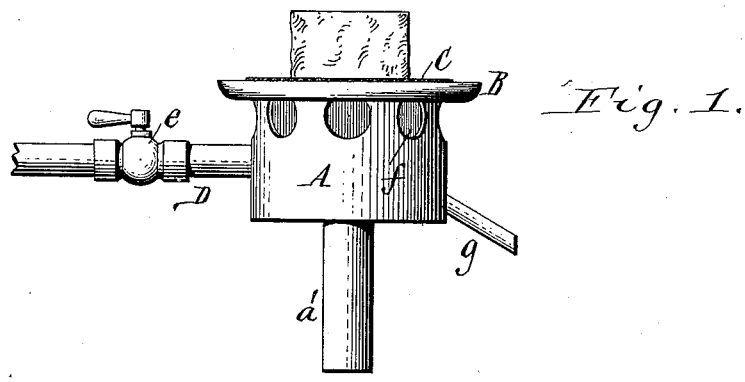
Figure 2:
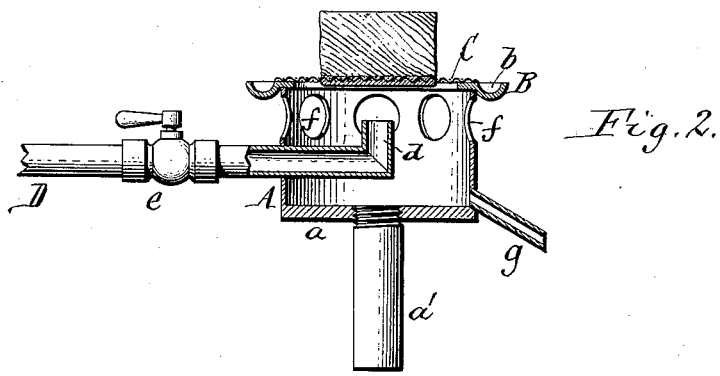
Figure 3:
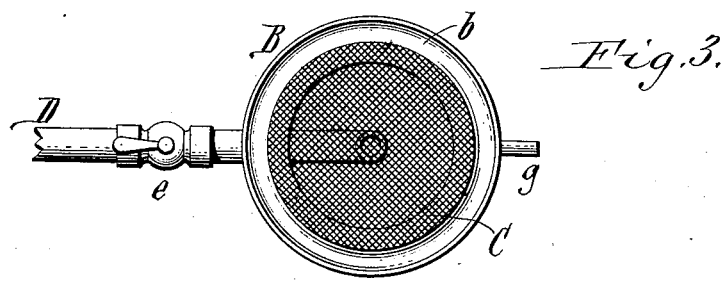

In the accompanying drawings, Figure 1 is a side elevation of my improved freezing device. Fig. 2 is a vertical section of the same. Fig. 3 is a top plan view of the same.

Like letters of reference refer to like parts in the several figures.

A represents the expansion-chamber of the freezing device, which is preferably cylindrical in form and provided with a bottom $a$, having a depending stem or shank $a'$, whereby the chamber is secured to the carriage of the microtome.

B represents a supporting-ring or annular plate secured upon the upper edge of the cylindrical side wall of the chamber and provided with a marginal annular gutter $b$.

C represents a horizontal foraminous table which supports the object to be sliced and which is secured, with its marginal portion, to the supporting-ring and covers the opening thereof. This table is preferably constructed of finely-woven wire, although it may also be made of finely-perforated sheet metal.

D represents a delivery pipe or tube whereby the freezing medium, such as carbon dioxid, is conducted against the under side of the foraminous table and the object lying on the same. This pipe extends through the side wall of the chamber and is provided within the same with an upturned nozzle $d$, which directs the freezing medium against the under side of the table, while its outer end is connected with the cylinder or holder containing the carbon dioxid or other freezing medium.

$e$ represents a valve or cock arranged in the delivery-pipe D in close proximity to the chamber A for controlling the escape of the freezing medium from the nozzle $d$.

$f$ represents openings formed in the upper portion of the cylindrical wall of the chamber A for the escape of the expanded freezing medium.

The object to be frozen is placed upon the foraminous table together with a few drops of water. Upon opening the valve $e$ in the delivery-pipe D the freezing medium issuing from the nozzle of this pipe strikes the object and the water on the table and causes the same to be frozen. The freezing of the water underneath the object and in the meshes of the table causes the ice so formed to become firmly attached to the object and also to the foraminous table by numerous small ice hooks or anchors which penetrate the table and embrace the solid portions thereof, as indicated in Fig. 2, thereby securely fastening the object to the table and permitting the object to be evenly and accurately sliced. This anchoring of the ice in the meshes or perforations of the table holds the object securely in place even when the ice expands or swells as the temperature rises to the swelling or expanding point, thus obviating the necessity of repeating the freezing operation from time to time for again attaching the object securely to the table, as has been the practice heretofore. Any surplus water which flows over the edge of the table is collected in the gutter $b$, surrounding the table, thereby preventing such water from collecting on the under side of the table and being frozen there into a thick mass of ice, which would impair the freezing effect of the gas upon the object. The spent gas escapes from the chamber through the openings $f$ in the side thereof, and any liquid which may fall upon the bottom of the chamber is carried off by a drain-pipe $g$.

The valve $e$ of the delivery-pipe is placed closely to the chamber and to the nozzle of the pipe, so that the carbon-dioxid or other freezing medium is required to pass only through a short length of the delivery-pipe after leaving the cock or valve, thereby reducing the tendency to form ice or snow in the delivery-pipe and preventing choking of the same.

I claim as my invention—

1. In a freezing device for microtomes, the combination with the delivery-pipe for the freezing medium, of a foraminous table arranged above the nozzle of said pipe and adapted to support the object, substantially as set forth.

2. In a freezing device for microtomes, the combination with the delivery-pipe for the freezing medium, of a foraminous table arranged above the nozzle of said pipe and provided with a marginal gutter, substantially as set forth.

3. In a freezing device for microtomes, the combination with the expansion-chamber having a foraminous top or table, of a delivery-pipe for the freezing medium opening in said chamber and provided with a cock or valve in proximity thereto, substantially as set forth.

Witness my hand this 21st day of December, 1898.

HARVEY R. GAYLORD.

Witnesses:
HENRY R. HOWLAND,
EDWARD WILHELM.